(12) United States Patent
Kawamura et al.

(10) Patent No.: US 6,522,354 B1
(45) Date of Patent: Feb. 18, 2003

(54) ELECTRONIC CAMERA AND METHOD OF OPERATING AN ELECTRONIC CAMERA

(75) Inventors: Tomoaki Kawamura, Kawasaki (JP); Norikazu Yokonuma, Tokyo (JP); Hirotake Nozaki, Kawasaki (JP); Akira Ezawa, Kawasaki (JP); Kazuyuki Kazami, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/093,055

(22) Filed: Jun. 8, 1998

Related U.S. Application Data
(60) Provisional application No. 60/056,261, filed on Aug. 29, 1997.

(30) Foreign Application Priority Data

Jun. 9, 1997 (JP) .............................................. 9-150839

(51) Int. Cl.[7] .......................... H04N 5/76; H04N 5/222; H04N 11/00; G09G 5/00
(52) U.S. Cl. ............................... 348/231.2; 348/231.3; 348/333.02; 348/333.05; 348/552; 345/838
(58) Field of Search ....................... 348/333.05, 333.02, 348/333.11, 231, 552, 231.2, 231.3, 231.6, 231.9; 345/838, 835, 837, 752

(56) References Cited

U.S. PATENT DOCUMENTS 5,706,097 A * 1/1998 Schelling et al. ........... 358/296
5,801,700 A * 9/1998 Ferguson ..................... 345/839
5,809,301 A * 9/1998 Miura ......................... 709/310
5,867,209 A * 2/1999 Irie et al. .................. 348/14.15
6,111,662 A * 8/2000 Satoh et al. ................. 358/442
6,118,480 A * 9/2000 Anderson et al. ........... 348/207
6,188,431 B1 * 2/2001 Oie .......................... 348/33.05
6,191,807 B1 * 2/2001 Hamada et al. ............... 348/15

FOREIGN PATENT DOCUMENTS

JP          09098271 A  *  4/1997     ............ H04N/1/32

* cited by examiner

*Primary Examiner*—Wendy R. Garber
*Assistant Examiner*—John M. Villecco
(74) *Attorney, Agent, or Firm*—Miles & Stockbridge P.C.

(57) ABSTRACT

An electronic camera displays recorded information, such as image frames, to permit the selection of items of information to be transferred to external equipment. Each time an item of information is transferred, an informative indication (e.g., an icon) is displayed in association with the transferred item to confirm the transfer and to permit an operator to select items of recorded information that may be erased. If an error occurs during transfer of a series of items, the operator can determine from the display the point at which the error occurred, avoiding the need for transferring items that have already been transferred.

29 Claims, 9 Drawing Sheets

ELECTRONIC CAMERA AND METHOD OF OPERATING AN ELECTRONIC CAMERA

CROSS REFERENCE TO RELATED APPLICATIONS

This application claims the benefit of U.S. Provisional Application No. 60/056,261, filed Aug. 29, 1997, which is incorporated herein by reference.

This application also claims the priority of Japanese Patent Application No. 9-150839 filed Jun. 9, 1997, which is also incorporated herein by reference.

BACKGROUND OF THE INVENTION

1. Field of the Invention

The present invention relates to an electronic camera, and to a method of operating an electronic camera adapted to capture an image of a subject, record the image on a recording medium, and also transfer recorded information to external equipment.

2. Related Background Art

Electronic cameras have been known in the past wherein picture information picked up by an image pickup device is recorded on a recording medium.

In such an electronic camera, the recording medium may be repeatedly used by erasing recorded information at an appropriate time. To this end, known electronic cameras are provided with various functions for erasing recorded information.

As one example of such erasing functions, it is known to erase all of the recorded information on a recording medium at one time by a manual command operation (as disclosed in Laid-Open Publication No. 6-90422 of Japanese Patent Application, for example).

It is also known to erase recorded information on a recording medium one item at a time by a manual command operation, while confirming this item of recorded information on a monitor screen, for example.

Many types of electronic cameras are known which have a function to transfer recorded information on a recording medium to external equipment. In transferring the recorded information to the external equipment utilizing this transfer function, the recorded information may be backed up or suitably processed as needed.

The transfer function may also be used to transfer the recorded information directly to an external printing apparatus so as to provide a printed copy or output of the recorded information.

In many cases, the recorded information transferred from the electronic camera to the external equipment is normally saved or output at the location to which the information was transferred, and it is erased at some time in the electronic camera.

In known cameras, when recorded information is transferred, the operator must determine whether each item of the recorded information has been transferred. This requires the operator to rely on memory or on a note made at the time of the transfer. This procedure is cumbersome, and possibly inaccurate, and is thus undesirable.

SUMMARY OF THE INVENTION

It is therefore an object of the invention to provide an electronic camera and operating method which do not require an operator to remember or note whether an item of recorded information has been transferred.

To achieve this object, an informative indication is displayed, which indicates transfer completion, corresponding to each item of recorded information that has been transferred. The operator can then determine from the informative indication whether recorded information has been transferred. Consequently, the operator need not remember or write down whether an item of recorded information has been transferred.

Another object of the invention is to provide an electronic camera and operating method that appropriately indicate how far transfer processing has proceeded during transfer of a plurality of items of recorded information.

To achieve this object, an informative indication is displayed each time a transfer of an item of recorded information is completed. By observing a change in the informative indications, the operator is able to confirm or determine how far the transfer processing has proceeded.

In the case where the transfer processing is terminated due to an error or abnormality, those items that have been transferred before the time of the termination can be easily determined from the informative indications. This permits the operator to perform subsequent transfer processing efficiently, by not transferring the same information twice, for example.

Still another object of the invention is to provide an electronic camera and operating method that enable an operator to properly select recorded information to be erased, depending on the transfer form or transfer destination of the recorded information.

To achieve this object, a displayed form of an informative indication is changed depending upon a transfer form or a transfer destination. Thus, the informative indication not only indicates whether the recorded information has been transferred, but also enables the operator to identify the transfer form or the transfer destination.

Consequently, the operator is able to appropriately and carefully perform the procedure of selecting an item or items to be erased, based on the transfer form employed for the transfer or the transfer destination.

When recorded information is transferred from the electronic camera through a communication line, the recorded information may not be backed up or saved in may cases. In the camera and operating method of the present invention, the operator can determine this situation from the informative indication, and is therefore able to appropriately and carefully perform the procedure of selecting items to be erased.

DESCRIPTION OF PREFERRED EMBODIMENTS

Figure 1:
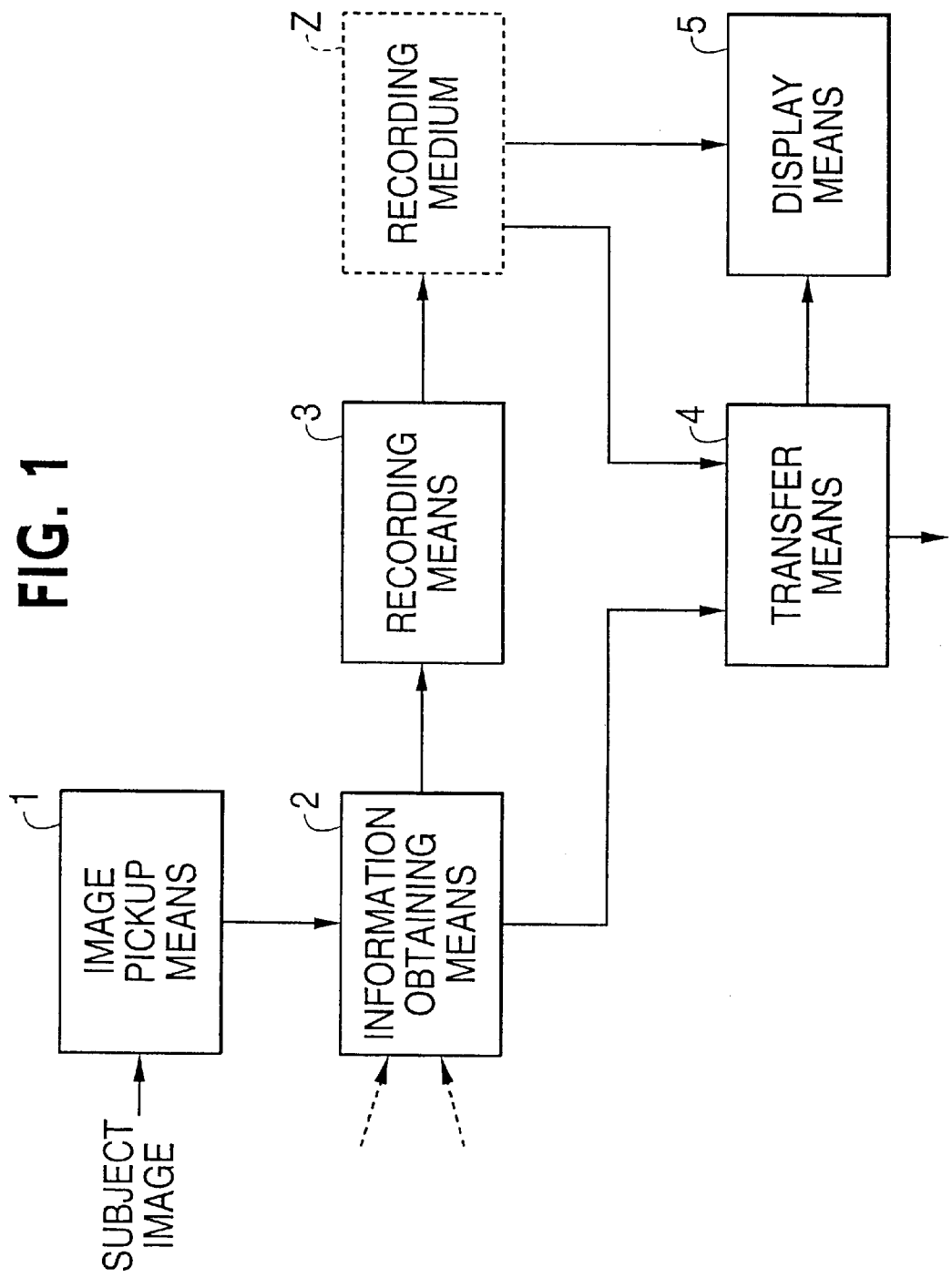
FIG. 1 is a block diagram showing a general embodiment of the invention.

In the electronic camera of FIG. 1, picture information taken by an image pickup means 1 is obtained by an information obtaining means 2 as record information to be recorded. Recording means 3 records this information on a recording medium Z. Transfer means 4 retrieves the recorded information from the recording medium Z, and transfers the recorded information to external equipment.

According to one aspect of the invention, display means 5 provides an informative indication for each item of recorded information that has been transferred by the transfer means 4, to inform that the item of recorded information has been transferred.

With the informative indication thus provided, the operator is able to determine whether an item or items of recorded information has/have been transferred. Thus, the operator can select the recorded information that has been transferred as an item to be erased, without relying on memory or a note made at the time of the transfer.

According to another aspect of the invention, the display means 5 successively displays an informative indication each time transfer of each item of information has been completed. By observing a change in the number of the number of informative indications, the operator is able to determine how far the transfer processing has proceeded.

When the transfer processing is terminated due to an error or abnormality, informative indications informing completion of transfer may be displayed along with those items of recorded information that have been transferred by the time of termination of the proceeding. Thus, the operator is able to easily determine which items of recorded information have been successfully transferred, and perform the subsequent transfer processing with improved efficiency.

According to another aspect of the invention, the display means 5 changes the displayed form of the informative indication depending upon the transfer form of the transfer means 4 or the transfer destination. Thus, the informative indication not only indicates whether recorded information has been transferred, but also enables the operator to identify the transfer form employed or the transfer destination.

When recorded information is transferred from the electronic camera, there may be two types of transfers, (1) a transfer where information is transferred and not backed up and (2) a transfer where information is transferred and backed up. With the first type of transfer, recorded information must be carefully erased to avoid undesired loss of information.

When recorded information is transferred from the electronic camera through a communication line, the recorded information is often not backed up. Such recorded information needs to be erased properly and carefully.

Because the transfer form employed for the transfer (e.g., communication line), or the transfer destination, can be determined based on the informative indications, items of recorded information to be erased can be selected properly and carefully.

Figure 2:
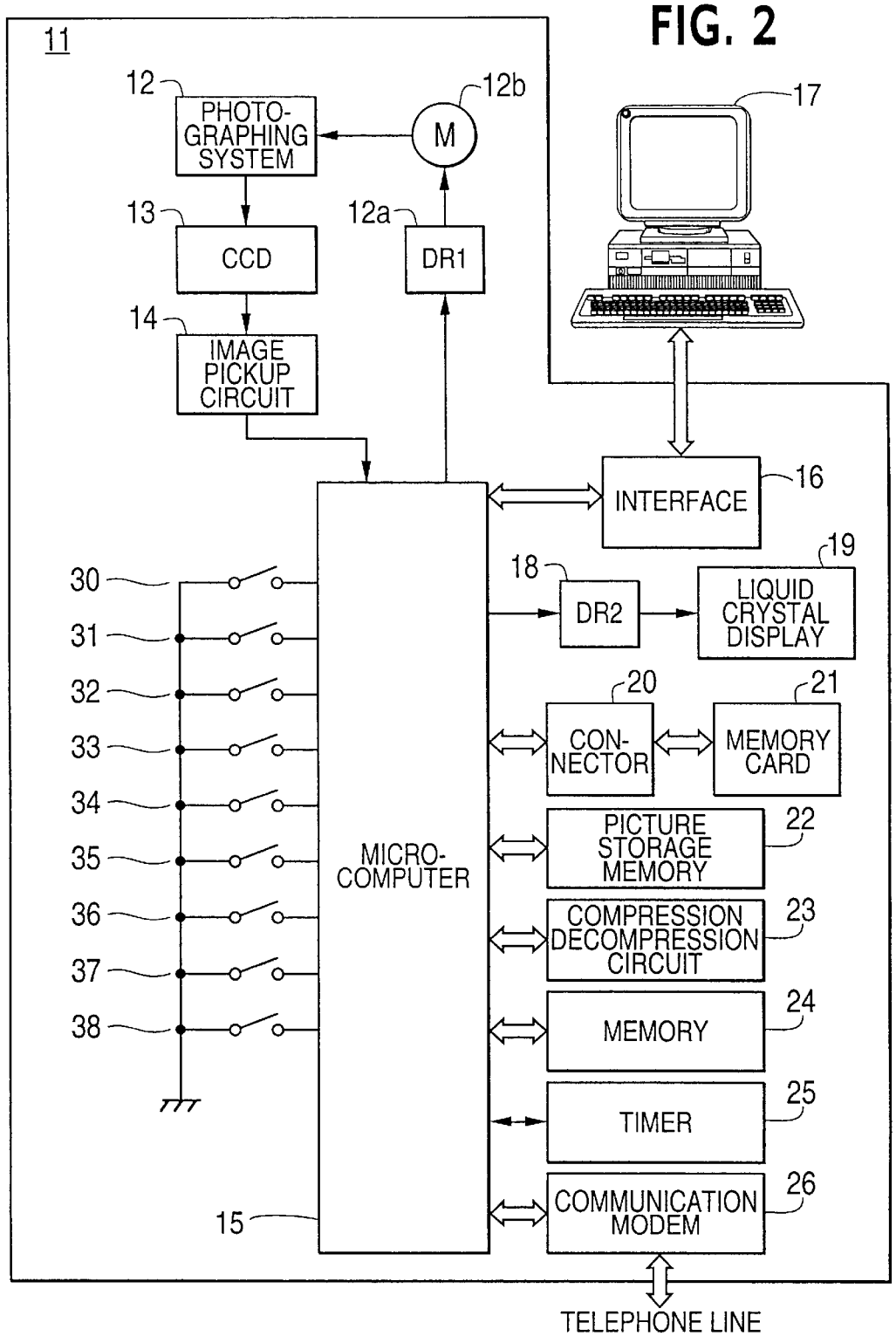
FIG. 2 is a diagrammatic view showing a particular embodiment.
Figure 3:
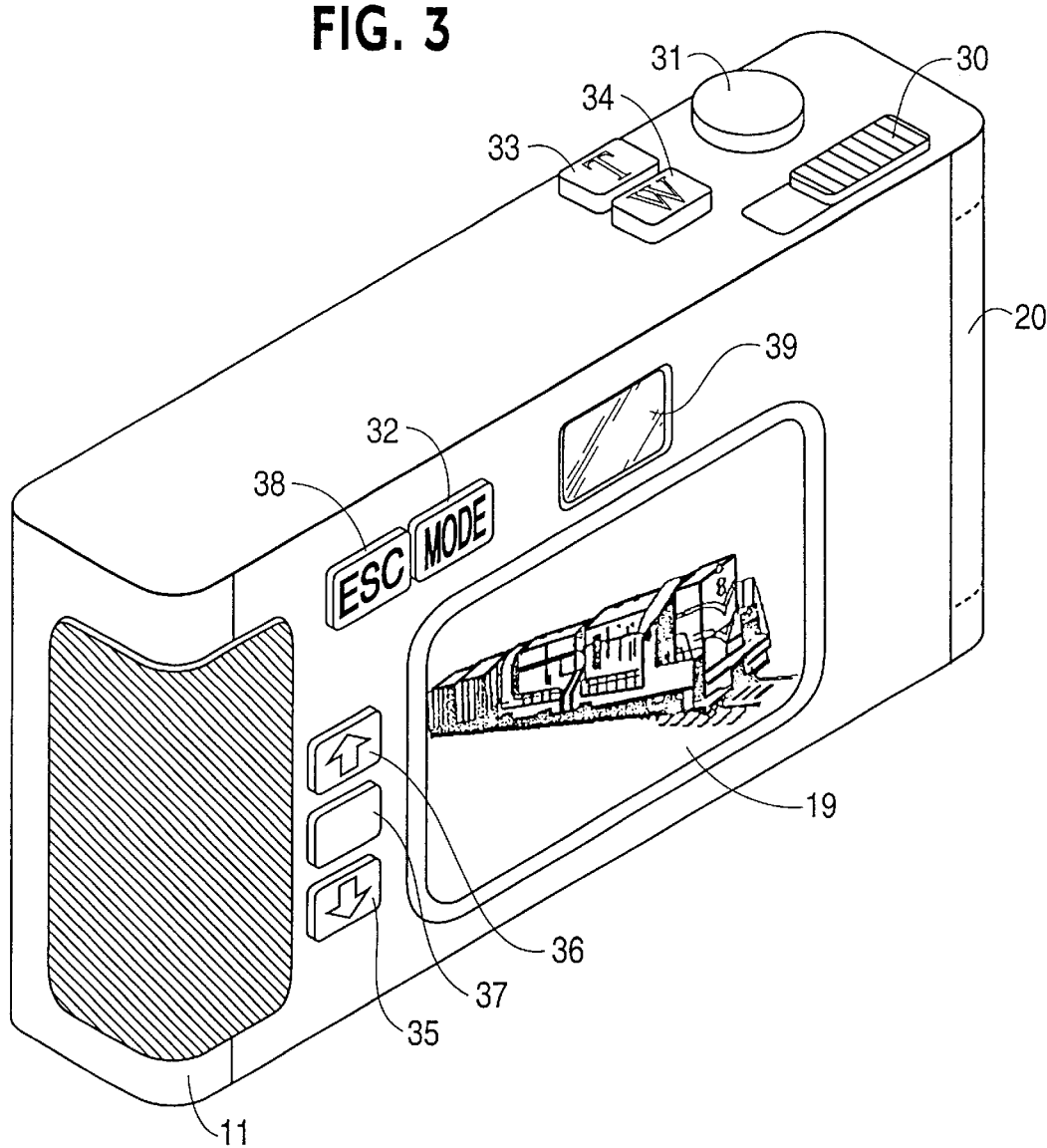
FIG. 3 is a perspective view showing the external appearance (on the side of the back face) of an electronic camera according to the particular embodiment.

Turning to the particular embodiment of the present invention shown in FIGS. 2 and 3, a photographing optical system 12 is mounted in the front face of a case of an electronic camera 11, and a CCD image pickup device 13 is located on the optical axis of the photographing optical system 12.

This photographing optical system 12 has a zooming function, and its focal length is varied by a zoom motor 12b driven by a motor drive circuit 12a.

The image output (picture information) of the CCD image pickup device 13 is input to a microcomputer 15 via an image pickup circuit 14, which performs conversion, e.g., A/D conversion and other functions.

The microcomputer 15 has a data bus to which a general-purpose interface 16 is connected. This interface 16 transfers data to an external computer 17 or the like via a cable, for example.

A liquid crystal display 19 is mounted in the back face of the case of the electronic camera 11, and is controlled by the microcomputer 15 via a liquid crystal drive circuit 18.

A connector 20 into which a memory card 21 is removably inserted is provided on the side face of the case of the electronic camera 11, and the microcomputer 15 records information in the memory card 21 through the connector 20 according to a known film format.

A picture storage memory 22 that temporarily stores picture information, a compression/decompression circuit 23 that performs compression and decompression of data according to DCT conversion or variable-length coding, a memory 24 that stores various types of control information, a timer 25 that measures time under control of the microcomputer 15, and a communications modem 26 that performs data communication through a telephone line, are also connected to the data bus of the microcomputer 15.

Also, a main switch 30, a release switch 31, a zoom-in switch 33 and a zoom-out switch 34 are disposed on the upper face of the case of the electronic camera 11.

Further, a mode switch 32, a forward select switch 35, a backward select switch 36, a confirmation switch 37, a cancel switch 38 and a finder 39 are disposed on the back face of the case of the electronic camera 11. Switches 30–38 are respectively connected to the microcomputer 15.

With regard to the relationship between the general embodiment in FIG. 1 and the particular embodiment in FIGS. 2 and 3, the image pickup means 1 corresponds to the CCD image pickup device 13 and image pickup circuit 14, the information obtaining means 2 corresponds to the functions of microcomputer 15 to obtain picture information from the image pickup circuit 14, the recording means 3 corresponds to the connector 20 and the functions of microcomputer 15 to record picture information on the memory card 21, the transferring means 4 corresponds to the interface 16 and the communications modem 26, and the display means 5 corresponds to the function of the microcomputer 15 to provide an informative indication on the liquid crystal display 19.

In operation, the electronic camera 11, constructed as described above, is initially set to a photographing mode immediately after the power is turned on.

In this photographing mode, picture information subjected to photoelectric conversion in the CCD image pickup device 13 is transmitted to the microcomputer 15 at the same time that the release switch 31 is pressed down.

The microcomputer 15 causes the compression/decompression circuit 23 to perform compression processing on the picture information, and then records the processed information in a free storage space in the memory card 21 as recorded information.

The microcomputer 15 constantly checks if the mode switch 32 has been pressed or not, and changes the operation mode in the following order each time the switch 32 is pressed.

Photographing Mode

Transfer Mode

Erase Mode

Operations in the transfer and erase modes will be described hereinafter.

Figure 4:
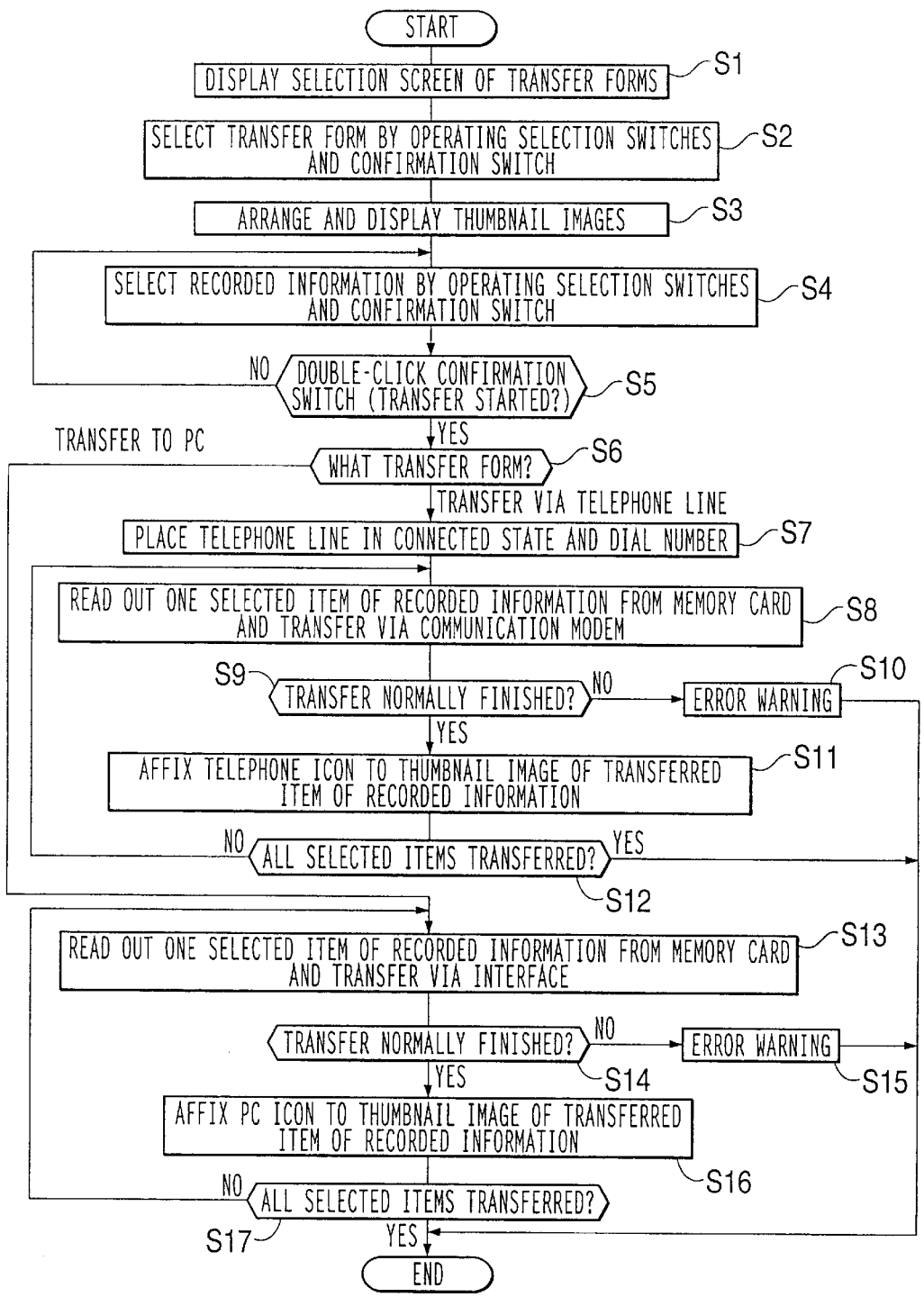
FIG. 4 is a flow chart showing the operations performed in a transfer mode.

FIG. 4 is a flow chart showing the operations performed in the transfer mode.

When the electronic camera 11 is set to the transfer mode, the microcomputer 15 displays a selection screen (FIG. 5) of transfer forms on the liquid crystal display 19. On this selection screen, two transfer forms consisting of "transfer to PC" (personal computer) and "telephone line" are displayed as alternative transfer forms (step S1).

In this state, the microcomputer 15 alternately moves the display of the alternative transfer forms in and out of focus, in response to the input received upon operation of the selection switches 35, 36, and obtains the result of selection of the transfer form at the point of time when the confirmation switch 37 is pressed (step S2).

Then, the microcomputer 15 sequentially retrieves the recorded information stored in the memory card 21, and produces thumbnail images used for reduction display.

More specifically, with respect to recorded information consisting of picture information, thumbnail images are produced by reducing the numbers of pixels in the vertical and horizontal directions at the same ratio.

The microcomputer 15 arranges these thumbnail images in order and displays them on the liquid crystal display 19 (step S3).

In this state, the operator operates the selection switches 35, 36 and confirmation switch 37, to sequentially select those items of recorded information on the liquid crystal display 19 that are to be transferred. The microcomputer 15 then serially adds pointer information of the selected items of recorded information to a transfer list provided in the memory 24 (step S4).

The microcomputer 15 repeats the above selection processing (when NO is obtained in step S5) until the confirmation switch 37 is double-clicked.

If the confirmation switch 37 is double-clicked (if YES is obtained in step S5), the microcomputer 15 starts transferring data according to the transfer form that has been selected in step S2 (step S6).

More specifically, where the data transfer is performed through a telephone line, the microcomputer 15 sends a command to the communications modem 26 to change the telephone line to the connected state (off the hook). In this state, the microcomputer 15 causes the communications modem 26 to dial a predetermined dial number (step S7).

When the telephone line has been placed in its calling state, the microcomputer 15 reads out one item of the recorded information listed in the transfer list from the memory card 21, and transfers the data to the called terminal through the communications modem 26 (step S8). The called terminal may be a computer on the other side of the telephone line, or a mail server of PC communications, for example.

The microcomputer 15 then checks through the communications modem 26 whether the data transfer has been normally finished (step S9). In the case where it is detected that the data transfer was abnormally terminated (if NO is obtained in step S9), the microcomputer 15 displays on the liquid crystal display 19 a warning informing the abnormality (step S10), and terminates the operation of the transfer mode.

Figure 6:
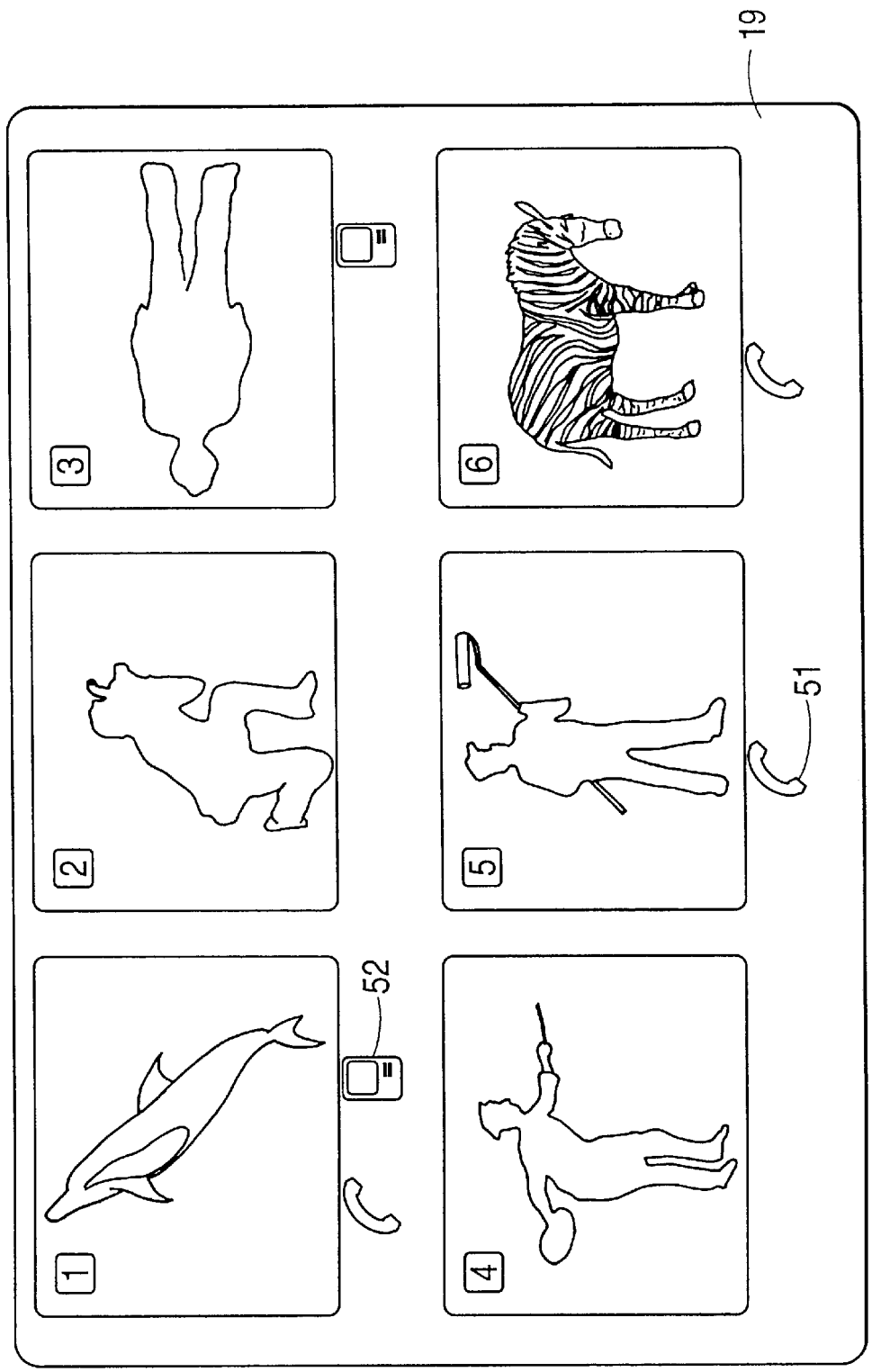
FIG. 6 is a view showing screen display after completion of transfer.

If the data transfer was normally finished (if YES is obtained in step S9), the microcomputer 15 links the transferred item of recorded information with a telephone icon 51 by affixing the telephone icon 51 as shown in FIG. 6 to a thumbnail image of the transferred item of recorded information, and displays the icon 51 along with this thumbnail image (step S11).

If the data transfer processing has not been completed with respect to all of the items to be transferred (if NO is obtained in step S12), the microprocessor 15 returns to step S8 and repeats the above-described transfer operation.

Figure 5:
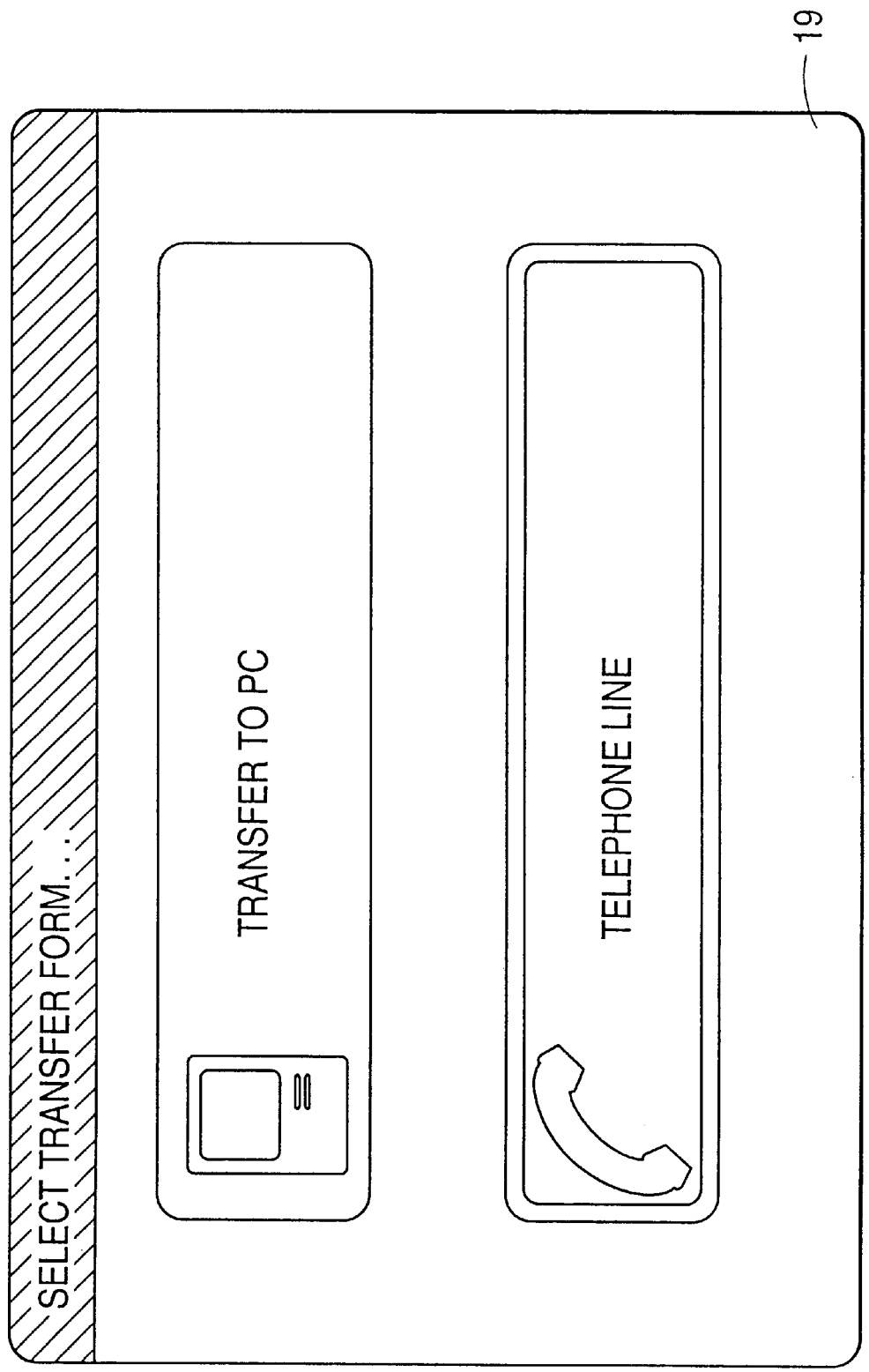
FIG. 5 is a view showing a selection screen of transfer forms.

If the transfer processing for all of the items to be transferred has been completed (if YES is obtained in step S12), the microcomputer 15 finishes the operation of the transfer mode.

Where "transfer to PC" shown in FIG. 5 was selected in step S2, the microcomputer 15 performs the operation of step S13 after executing step S6, so as to implement data transfer through the interface 16.

In this case, the microcomputer 15 reads out from the memory card 21 one item of the recorded information listed in the transfer list and transfers the data to a receiver terminal 17 connected to the interface 16 via a cable (step S13). The receiver terminal may be a computer, backup apparatus, or a printing apparatus, for example. In this transfer form, no communications line (such as a telephone line) is interposed between the electronic camera and the receiver terminal. It is to be understood that the interface 16 is not necessarily connected to external equipment through a cable, but may be connected to the external equipment by means of infrared rays or radio waves, for example.

The microcomputer 15 checks through the interface 16 whether the data transfer has been normally finished (step S14). If it is detected that the data transfer was abnormally terminated (if NO is obtained in step S14), the microcomputer 15 displays a warning on the liquid crystal display 19 informing the abnormality (step S15), and terminates the operation of the transfer mode.

When the data transfer was normally finished (when YES is obtained in step S14), the microcomputer 15 links the transferred item of recorded information with a PC icon 52 by affixing the PC icon 52 to a thumbnail image of the transferred item of recorded information as shown in FIG. 6, and displays the icon 52 along with this thumbnail image (step S16).

If the data transfer processing has not been completed with respect to all of the items to be transferred (if NO is obtained in step S17), the microprocessor 15 returns to step S13 and repeats the above-described transfer operation.

If the data transfer processing for all of the items to be transferred has been completed (if YES is obtained in step S17), the microcomputer 15 finishes the operation of the transfer mode.

Next, the operations in the erase mode will be explained.

Figure 7:
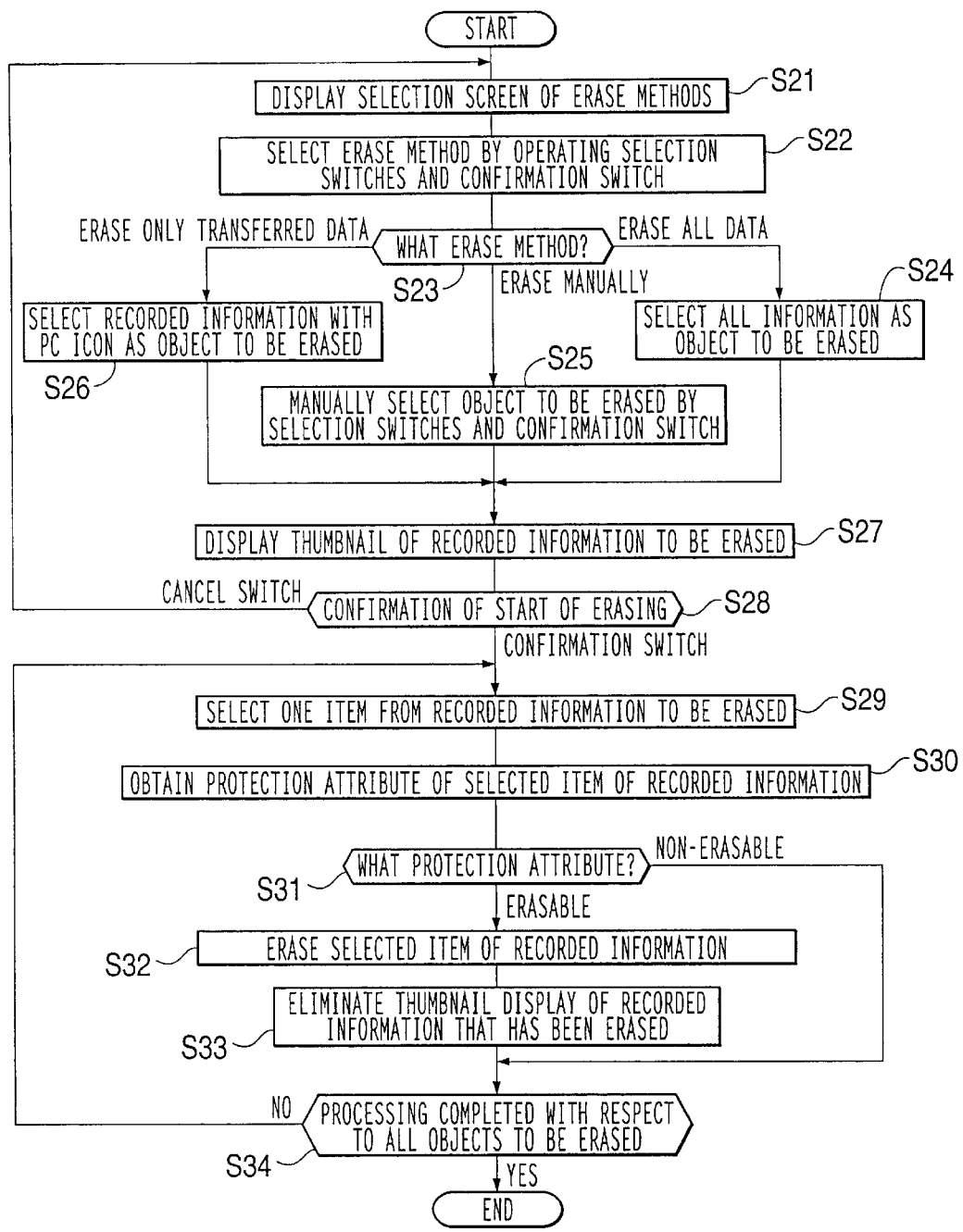
FIG. 7 is a flow chart showing the operations performed in an erasing mode.

FIG. 7 is a flow chart showing operations performed in the erase mode.

When the electronic camera 11 is set to the erase mode, the microcomputer 15 displays a selection screen of erasing methods on the liquid crystal display 19. On this selection screen, three erasing methods consisting of "erase all data", "erase manually" and "erase only transferred data" are displayed as alternatives (step S21).

In this state, the microcomputer 15 moves the display of the alternatives sequentially in and out of focus, in response to the input received upon operation of the selection switches 35, 36, and obtains the result of the selection of the erasing method at the point when the confirmation switch 37 is pressed (step S22).

Then, the microcomputer 15 selects an item or items to be erased from the recorded information, according to the result of selection of the erasing method.

More specifically, when "erase all data" is selected, all items of the recorded information on the memory card 21 are selected as the items (objects) to be erased (step S24).

When "erase manually" is selected, the microcomputer 15 arranges and displays thumbnail images of the recorded information on the liquid crystal display 19. In this state, the microcomputer 15 determines the object(s) to be erased, which was/were selected by the operator with the selection switches 35, 36 and confirmation switch 37 (step S25).

When "erase only transferred data" is selected, the microcomputer 15 selects, as the object(s) to be erased, one or more items of the recorded information to which the PC icon(s) 52 was/were affixed as shown in FIG. 6 (step S26).

When the selection of the object(s) to be erased is completed as described above, the microcomputer 15 displays on the liquid crystal display 19 a thumbnail image representing the recorded information of each object to be erased (step S27).

The microcomputer 15 then checks if either of the confirmation switch 37 or cancel switch 38 is pressed (step S28).

If the cancel switch 38 is pressed, the microcomputer 15 judges that a problem or mistake has occurred in selecting the objects to be erased, and returns to step S21 to re-execute selection of the objects to be erased.

If the confirmation switch 37 is pressed, on the other hand, the microcomputer 15 starts erasing the object(s) to be erased in the following manner.

Initially, the microcomputer 15 selects one item of recorded information to be erased (step S29), and obtains a protection attribute of this item of the recorded information from the memory card 21 (step S30).

When the protection attribute is set to "inhibit the information from being erased", the microcomputer 15 does not erase this item of recorded information (step S31), and turns to execute step S34.

When the protection attribute is set to "allow the information to be erased", on the other hand, this item of recorded information is erased from the memory card 21 (step S32). The microcomputer 15 then eliminates from the liquid crystal display 19 the display of a thumbnail image corresponding to that item of recorded information which has been erased (step S33).

If the above processing has not been completed with respect to all of the objects to be erased (if NO is obtained in step S34), the microcomputer 15 returns to step S29 and repeats the above-described operations.

If the processing has been completed with respect to all of the objects to be erased (if YES is obtained in step S34), the microcomputer 15 finishes the operations of the erase mode.

In the electronic camera 11 of the present embodiment, which operates as explained above, the PC icon 52 or telephone icon 51 is displayed in association with each item of recorded information that has been transferred.

Accordingly, the operator need not remember or write down whether items of recorded information have been transferred.

Also, in the electronic camera 11 of the present invention, the PC icon 52 or telephone icon 51 is added for display each time the transfer of one item of recorded information is completed. By observing changes in the informative indications, the operator is able to determine how far the transfer processing has proceeded.

Figure 8:
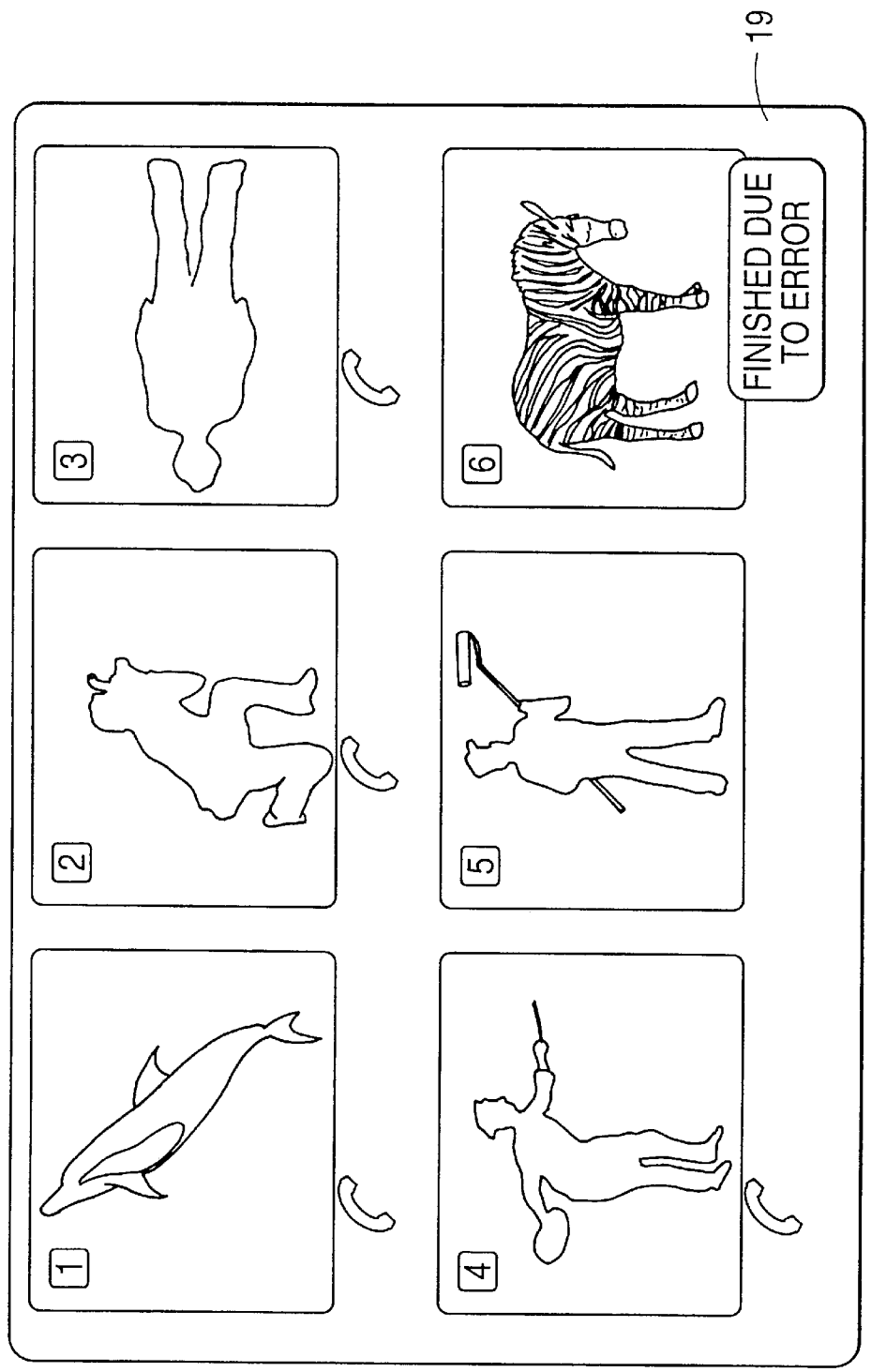
FIG. 8 is a view showing screen display when the transfer operation is terminated due to an error.

FIG. 8 shows liquid crystal display 19 when the transfer processing is terminated due to occurrence of an error or abnormality. This display shows that an error occurred during the transfer of first to sixth items of recorded information, in increasing numerical order, through a telephone line, and that the processing was terminated during transfer of the fifth item of recorded information. Note that telephone icons 51 are affixed to and displayed along with the first to fourth items of the recorded information, and therefore, the operator is appropriately informed of the fact that the fifth and following items were not transferred. In subsequent transfer processing, the operator can resume transfer with respect to the remaining fifth and sixth items, without transferring the same data twice, thus assuring high efficiency.

In the electronic camera 11 of the present embodiment, the telephone icon 51 is affixed to and displayed along with each item of recorded information transferred through a telephone line, and the PC icon 52 is affixed to and displayed along with each item of recorded information that was transferred without passing through the telephone line.

The recorded information to which a telephone icon 51 is affixed is often transferred with no assurance that a backup copy of the transferred information exists.

The recorded information to which a PC icon 52 is affixed, on the other hand, is often transferred to a computer, a backup apparatus or a printing apparatus, and there is a high probability that a backup or printed copy of the information exists separately.

Thus, the operator can distinguish the items of recorded information accompanied only by the telephone icons 51 from others on the liquid crystal display 19, and can determine carefully whether items of recorded information shall be erased.

Similarly, the operator can distinguish items of recorded information accompanied by the PC icons 52 from others on the liquid crystal display 19, and can promptly select items of information as objects to be erased.

Further, the electronic camera 11 of the present embodiment is provided with an automatic selecting function for automatically selecting items of recorded information to which a PC icon 52 is affixed as an object to be erased, as shown in step S26 of FIG. 7. This function makes it possible to automatically select and erase an item of recorded information for which a backup or printed copy is highly likely to exist. Thus, recorded information can be erased with significantly improved efficiency.

Figure 9:
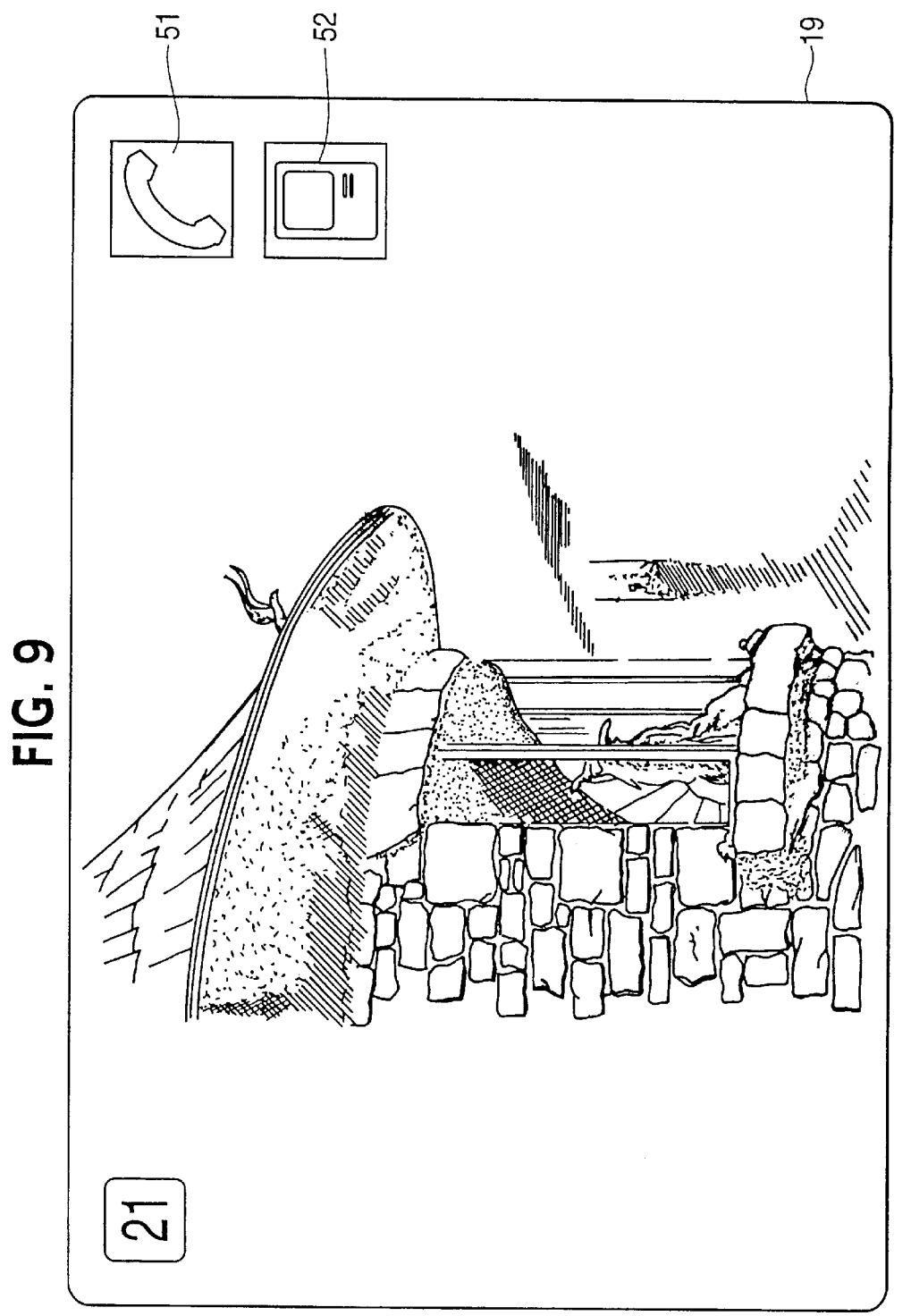
FIG. 9 is a view showing screen display when recorded information is displayed over the entire area of a display screen.

While plural thumbnail images are arranged and displayed on the liquid crystal display 19 in the present embodiment, the present invention is not limited to this mode. For example, a single item of recorded information may be displayed over the entire area of the liquid crystal display 19, as shown in FIG. 9. In this case, the operator is able to look at a selected or desired item of recorded information by feeding recorded information one frame after another by use of the selection switches 35, 36.

Simultaneous with the display of each item, the PC icon 52 or telephone icon 51 may be displayed in a part of the screen, so as to provide an informative indication that the displayed item of information has been transferred.

While the PC icon 52 and telephone icon 51 are selectively displayed depending upon the transfer form selected for data transfer in the present embodiment, the present invention is not limited to this arrangement. The display mode of such indications informing the transfer form may be changed depending, e.g., upon the destination to which the recorded information was transferred. When the data transfer is performed through a telephone line, for example, the informative indications displayed may be changed depending upon the dialed terminal number. Where the data transfer is performed through an interface 16 such as a universal serial bus (USB), the informative indications displayed may be changed for each ID number representing a receiver that answered the call. With such informative indications provided, the operator is appropriately informed of the destination of transfer of each item of recorded information, and is able to effectively utilize the destination as a criterion for determining whether the relevant item of information is to be erased or not.

While the telephone line is listed as one type of a communication line in the present embodiment, the present invention is not limited to this type. Generally, communication lines may include communication networks, such as INTERNET, or radio communication networks.

Although the electronic camera 11 has an erasing function in the present embodiment, the present invention is not limited to this arrangement. Generally, the informative indication of transfer form according to the present invention is useful for electronic cameras having no erasing function. Where data on the memory card 21 is erased on a separate apparatus, for example, an object(s) to be erased can be appropriately selected referring to the informative indication (s) provided on the electronic camera.

While the informative indications are displayed in the form of telephone icons 51 and PC icons 52 in the illustrated embodiment, the present invention is not limited to these types of indications. For example, the indications informing the transfer form may be provided using different forms of displaying frames of thumbnail images, different colors of the frames, characters, symbols and others.

When the same recorded information is transferred to the external equipment a plurality of times in the illustrated embodiment, an indication may be provided which permits the number of transfers to be identified. For example, the same number of icons as the number of transfers may be displayed, or the number of transfers may be displayed in the middle of the corresponding icon. With such indications thus provided, the operator is appropriately informed of the number of transfers of the recorded information, and is able to effectively use it as a criterion when determining whether the information has been transferred to all the locations to which it should be transferred.

Although the electronic camera 11 transfers recorded information from the memory card 21 in the illustrated embodiment, items of information may be transferred directly from an information obtaining means. See FIG. 1.

Although the electronic camera 11 picks up and records image data in the illustrated embodiment, other data such as voice data may also be processed. With respect to record information consisting solely of voice information, thumbnail images may be produced by combining a picture display, such as a tone symbol, and a character display representing reproduction time, for example. The voice data may be picked up using an external microphone. See the dashed arrows in FIG. 1.

Although the electronic camera 11 inputs image data from an image pick-up device, picture or voice data to be processed may be input directly from an external input terminal. See the dashed arrows in FIG. 1.

Although the electronic camera 11 can automatically erase items of recorded data that have been transferred, the electronic camera could prevent data from being erased, or display a specific appropriate warning, so as to inhibit inadvertent erasing of non-transferred items and items that were transferred in an insecure manner.

While preferred implementations of the invention have been shown and described, it will be apparent to those skilled in the art that changes can be made in these implementations without departing from the principles and spirit of the invention, the scope of which is defined by the appended claims.

What is claimed is:

1. An electronic camera comprising:
   image pickup means for capturing an image of a subject and producing picture information;
   information obtaining means for obtaining record information including at least one of said picture information, voice information which is provided through a microphone, and information which is provided through an external input terminal;
   recording means for receiving record information from said information obtaining means, and recording record information on a recording medium;
   transfer means for receiving record information from said recording medium or from said information obtaining means, and transferring record information to external equipment; and
   display means for displaying Information relating to record information, wherein said display means provides informative indications of transferred record information when record information has been transferred by said transfer means, and each of said informative indications is displayed along with a corresponding display of record information only when transfer thereof is complete and each of said informative indications has a predetermined display form related to a transfer form or destination, thereby identifying record information that has been transferred and identifying the transfer form or destination.

2. An electronic camera as defined in claim 1, wherein said transfer means sequentially transfers a plurality of items of record information, and said display means displays an informative indication each time transfer of an item of record information has been completed.

3. An electronic camera as defined in claim 1, wherein said display means displays the transfer form of said transfer means so as at least to inform whether record information has been transferred through a communication line.

4. An electronic camera as defined in claim 1, wherein each informative indication is an icon identifying a transfer form or destination.

5. An electronic camera as defined in claim 4, wherein each display of record information is an image.

6. An electronic camera as defined in claim 1, further comprising erasing means for erasing at least part of recorded information.

7. An electronic camera as defined in claim 6, wherein said erasing means permits selection of recorded information to be erased based on said informative indications.

8. An electronic camera as defined in claim 6, wherein said erasing means automatically selects recorded information to be erased based on said informative indications.

9. An electronic camera as defined in claim 1, wherein at least one of said informative indications indicates the number of times corresponding record information has been transferred.

10. An electronic camera comprising:
an image pickup device that captures an image of a subject and produces picture information;
an information obtaining device connected to said image pickup device to obtain record information including at least one of said picture information, voice information which is provided through a microphone, and information which is provided through an external input terminal;
a recording device connected to said information obtaining device to receive record information from said information obtaining device and to record that information on a recording medium;
a transfer device connected to said recording device and to said obtaining device to transfer record information from said recording medium or from said information obtaining device to external equipment; and
a display device connected to said recording device to display information relating to record information, wherein said display device is connected to said transfer device to provide informative indications of transferred record information when record information has been transferred by said transfer device, and each of said informative indications is displayed along with a corresponding display of record information only when transfer thereof is complete and each of said informative indications has a predetermined display form related to a transfer form or destination, thereby identifying record information that has been transferred and identifying the transfer form or destination.

11. An electronic camera as defined in claim 10, wherein said transfer device sequentially transfers a plurality of items of record information, and said display device displays an informative indication each time transfer of an item of record information has been completed.

12. An electronic camera as defined in claim 10, wherein said display device displays the transfer form of said transfer device so as at least to inform whether record information has been transferred through a communication line.

13. An electronic camera as defined in claim 10, wherein each informative indication is an icon identifying a transfer form or destination.

14. An electronic camera as defined in claim 13, wherein each display of record information is an image.

15. An electronic camera as defined in claim 10, further comprising an erasing device for erasing at least part of recorded information.

16. An electronic camera as defined in claim 15, wherein said erasing device permits selection of recorded information to be erased based on said informative indications.

17. An electronic device as defined in claim 15, wherein said erasing device automatically selects recorded information to be erased based on said informative indications.

18. An electronic camera as defined in claim 10, wherein at least one of said informative indications indicates the number of times corresponding record information has been transferred.

19. A method of operating an electronic camera comprising:
capturing an image of a subject and producing picture information;
obtaining record information, including at least one of picture information and voice information;
recording obtained record information on a recording medium;
transferring record information to external equipment; and
displaying information relating to the record information, wherein said displaying provides informative indications of transferred record information when record information has been transferred, and each of said informative indications is displayed along with a corresponding display of record information only when transfer thereof is complete and each of said informative indications has a predetermined display form related to a transfer form or destination, thereby identifying record information that has been transferredand identifying the transfer form or destination.

20. A method as defined in claim 19, wherein a plurality of items of record information are transferred sequentially and an informative indication is displayed each time transfer of an item of record information has been completed.

21. A method as defined in claim 19, wherein the transfer form is displayed so as at least to inform whether record information has been transferred through a communication line.

22. A method as defined in claim 19, further comprising erasing at least part of recorded information.

23. A method as defined in claim 22, further comprising selecting recorded information to be erased based on said informative indications.

24. A method as defined in claim 22, further comprising automatically selecting recorded information to be erased based on said informative indications.

25. A method as defined in claim 19, wherein at least one of said informative indications indicates the number of times corresponding record information has been transferred.

26. An apparatus for recording image information and transferring the recorded image information to external equipment, wherein, when an item of recorded information has been transferred, an informative indication of the transfer of that item of recorded image information is associated with an image of that item to identify items that have been transferred, wherein a display device displays an image of each item to be transferred and then displays an informative indication in association with the image of each transferred item only when transfer of that item is complete, and wherein each informative indication has a predetermined display form related to a transfer form or destination.

27. An apparatus as defined in claim 26, wherein the informative indication is an icon.

28. A method as defined in claim 19, wherein each display of record information is an image and each informative indication displayed along with a corresponding display of record information is an icon.

29. An apparatus as defined in claim 25, wherein at least one of said informative indications indicates the number of times corresponding record information has been transferred.

* * * * *